US006694802B1

United States Patent
Comardo

(10) Patent No.: US 6,694,802 B1
(45) Date of Patent: Feb. 24, 2004

(54) DELTA P TESTING SYSTEM FOR TUBE AND SHELL TYPE CATALYTIC REACTORS

(76) Inventor: Mathis P. Comardo, 7042 Satsuma Dr., Houston, TX (US) 77041

( * ) Notice: Subject to any disclaimer, the term of this patent is extended or adjusted under 35 U.S.C. 154(b) by 28 days.

(21) Appl. No.: 09/961,482

(22) Filed: Sep. 21, 2001

Related U.S. Application Data

(60) Provisional application No. 60/234,646, filed on Sep. 22, 2000.

(51) Int. Cl.⁷ .............................................. G01M 3/02
(52) U.S. Cl. ........................... 73/37; 414/160; 414/162
(58) Field of Search .............................. 73/37; 414/160, 414/162

(56) References Cited

U.S. PATENT DOCUMENTS

| | | | | |
|---|---|---|---|---|
| 4,701,101 A | * | 10/1987 | Sapoff | 414/162 |
| 5,890,868 A | * | 4/1999 | Comardo | 414/160 |
| 5,897,282 A | * | 4/1999 | Comardo | 414/160 |

* cited by examiner

Primary Examiner—Helen Kwok
Assistant Examiner—André K Jackson
(74) Attorney, Agent, or Firm—James L. Jackson; Andrews Kurth LLP

(57) ABSTRACT

A multi-tube differential pressure testing system for testing catalyst filled tubes of tube and shell type catalytic reactors having an upper tube sheet and multiple catalyst tubes having upper ends thereof fixed to the upper tube sheet. The system has at least one mobile support device for selective positioning on the upper tube sheet of a catalytic reactor. A plurality of testing tubes are mounted to the mobile support device and are selectively positionable in sealed gas pressure communicating engagement with the upper ends of a plurality of reactor tubes. A pressure testing gas delivery system is interconnected with the testing tubes and is adapted for communicating pressurized gas at a selected test pressure to the testing tubes and into the reactor tubes being engaged thereby. A differential pressure measurement system is provided in the testing system for measuring the back pressure resulting from application of gas pressure at the selected test pressure to the reactor tubes being tested and having a differential pressure indicator system providing a visual indication of the resulting back pressure of each reactor tube being tested.

18 Claims, 5 Drawing Sheets

DELTA P TESTING SYSTEM FOR TUBE AND SHELL TYPE CATALYTIC REACTORS

This application claims the benefits of U.S. Provisional Application No.: 60/234,646 filing date Sep. 22, 2000.

BACKGROUND OF THE INVENTION

1. Field of the Invention

The present invention relates generally to tube and shell type catalytic reactors having a large number of catalyst containing tubes which are supported in a reactor chamber by upper and lower tube support sheets and which contain catalyst pellets for accomplishing a catalytic reaction with a fluid flowing through the catalyst containing tubes. More particularly, the present invention concerns a testing system for measuring differential pressure of the catalyst containing reaction tubes by introducing pressure at a predetermined flow rate into selected tubes and by reading the back-pressure of the tubes through a transmitter.

2. Description of the Prior Art

Tube and shell type catalytic reactors are typically of cylindrical configuration, having a cylindrical outer pressure containing wall for containing reaction fluids. Upper and lower tube sheets are typically welded to the upper and lower ends of the outer cylindrical wall or shell, so as to be oriented in parallel relation with one another. Intermediate tube sheets, between the upper and lower tube sheets, may also be mounted to the outer shell in the same manner. The reactor tubes are typically welded to the upper and lower tube sheets at a multiplicity of holes in the tube sheets, so that process fluids may flow from above or below the tube sheets through the passages of the reactor tubes and thus through the catalyst pellets that fill or partially fill the reactor tubes, thus causing the catalyst to react with the process fluid to provide the desired reaction and yield a desired fluid product. Tube and shell type catalytic reactors also have upper and lower domed closures that are typically removably secured to the cylindrical outer shell by means of a multiplicity of bolts or threaded studs. The upper and lower domed closures are removable to permit the reactor to be serviced, repaired or overhauled.

From time to time the catalyst pellets within the reactor tubes will become substantially spent and the quality of the reaction thereof with the process fluid will become degraded. By conducting periodic tests of the reacted product being yielded by reaction with the catalyst of the reactor tubes, a determination can be made to shut down the reactor and overhaul the reactor by removing the spent catalyst from the reactor tubes and replacing the spent catalyst with new catalyst material. The condition of the catalyst within the reactor tubes can sometimes be detected by measurement of the back pressure of gas, typically air, being forced through the reactor tubes at a predetermined pressure and rate of flow. This test will also permit any leaking reactor tubes to be detected, so that they can be taken out of service by welding plugs into the upper and lower tube openings. Obviously, to permit differential pressure testing to be accomplished the reactor must be taken out of service and at least one of the upper and lower domed closures must be removed to permit access to the ends of the reactor tubes.

Differential pressure testing of reactor tubes is considered necessary after spent catalyst has been replaced with new catalyst material. If the tubes have been properly filled with catalyst material, each of the multiplicity of reactor tubes will have substantially the same back pressure when differential pressure testing is accomplished. If any of the reactor tubes are improperly filled, the catalyst material thereof can be removed and the tube can be refilled. If not properly filled, certain catalyst tubes of the reactor can develop hot spots within the reactor which may cause the reactor to degrade earlier than expected or it can cause improper reaction to occur, so that the quality of the resulting product can be less than optimum.

An apparatus for differential pressure testing of the filled reactor tubes of tube and shell type catalytic reactors has been developed and utilized. This apparatus permits manual selection and differential pressure testing to be accomplished, one tube at a time. Thus, with many tube and shell type catalytic reactors having as many as 20,000 reactor tubes and some reactors having from 40,000 to 80,000 reactor tubes, this manual testing apparatus is typically utilized by randomly testing selected reactor tubes after the tubes have been filled with catalyst material. This single tube testing apparatus presents some test data in the form of a visual back pressure indication, but does not provide any sort of read-out that can be inspected and maintained as a record. This apparatus is composed of interconnected pipe sections having a tube engaging lower resilient element through which air is permitted to flow into the selected tube. A pressure regulator is mounted to the piping to regulate air pressure being delivered to the unit via a supply hose that is connected to the piping by a quick-disconnect fitting, with the air supply being controlled by a simple lever operated on-off or open-close valve. A pressure gauge is provided in the piping to visually indicate the air pressure being supplied and a differential pressure monitor is also mounted to the unit for visual inspection by the person using the apparatus and being coupled by a tube to the piping at a point below an orifice element. To enable the tapered lower resilient element of the unit to establish sealing engagement with a selected reactor tube, a lateral pipe section is provided which is engaged by the foot of the user to permit sufficient downward force to be applied to deform the tapered lower resilient element against the reactor tube.

It is desirable to provide a mechanism for simultaneously conducting differential pressure testing of a plurality of reactor tubes, for example 8 or 10 tubes to facilitate rapid and simplified reactor tube testing so that all of the reactor tubes of a tube and shell type catalytic reactor can be tested. It is also desirable to provide the test results of differential pressure reactor tube testing in the form of an electronically documented read-out that can be presented in the form of a paper or hard copy, permitting the state of all of the reactor tubes to be indicated and a permanent record to be established. Further, it is desirable to provide a rather complex reactor tube differential pressure testing system that is simple and efficient for rapid use by unskilled workers and which yields quality test results.

SUMMARY OF THE INVENTION

The differential pressure testing system of the present invention accomplishes testing of each of the multiplicity of catalyst containing reactor tubes of a tube and shell type catalytic reactor and provides a permanent electronic and or hard copy record of the test of each of the reactor tubes, thereby enabling the owner or operator of the reactor to determine at any given point in time if the reactor is performing properly or if it is in need of cleaning and catalyst changing in order to meet desired performance standards.

Though not limiting, the invention may be practiced by locating on the upper tube sheet of the reactor at least one and preferably a plurality of test carts, with each of the test carts connected by electrical and pneumatic umbilical with a control cart which is preferably located off to the side of the upper tube sheet or plate of the reactor. Four test carts are shown in the drawings but more or less may be used if desired. Though one control cart is shown, more than one may be utilized, each having umbilical connection with one or more test carts.

The control cart contains a computer having a memory system and may also include a computer driven printer which produces a hard (paper) copy of test data for each of the tubes that is tested. The computer memory may be downloaded to a larger, permanent memory system if desired so that the test data may be available for comparative use with subsequently acquired test data if desired or used in any manner that benefits the reactor owner or reactor service contractor. The control cart has connections for compressed air or other test gas under pressure and for electrical power, typically 120 v A/C. Electrical, ethernet computer conductors and pneumatic conductors are provided in an umbilical cable for each of the test carts and are received by umbilical connections of the control cart.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is a side elevational view of a control cart embodying the principles of the present invention and showing a folding work top positioned for support of a computer keyboard and showing a printer and umbilical air connections;

FIG. 2 is an isometric illustration viewed from the top, side and back of the control cart and with the housing thereof closed, such as for storage, transport or movement;

FIG. 3 is an isometric illustration of one of the differential pressure test carts as shown from the top, front and one end thereof and with the data input screen and key pad and the plurality of two axes testing tubes thereof being shown;

FIG. 4 is a front elevational view of a four tube test cart embodying the principles of the present invention;

FIG. 5 is a side elevational view of the test cart of FIG. 4;

FIG. 6 is an electrical and pneumatic schematic illustration of a differential pressure testing system in the form of an eight channel model for testing eight reactor tubes at each testing position;

FIG. 7 is an electronic schematic illustration showing the data and entry display of a testing cart and its cable connection with the computer of the control cart of the testing system;

FIG. 8 is a partial schematic illustration showing the data communication connection of the electronic system of a test cart with the computer of the control cart; and FIG. 9 is a pneumatic schematic illustration of the pneumatic system of the differential pressure testing system of the present invention.

DETAILED DESCRIPTION OF PREFERRED EMBODIMENT

Figure 1:
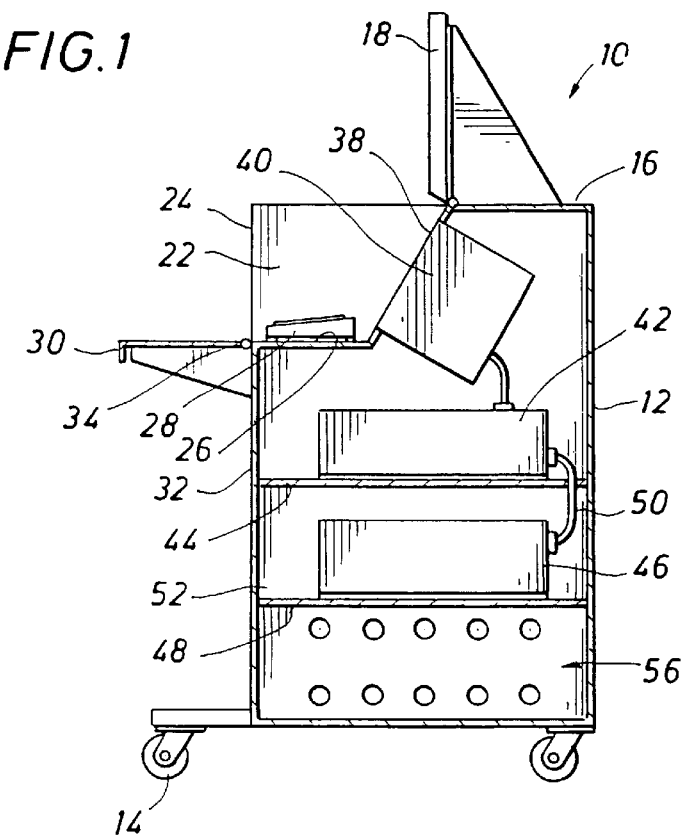
Figure 2:
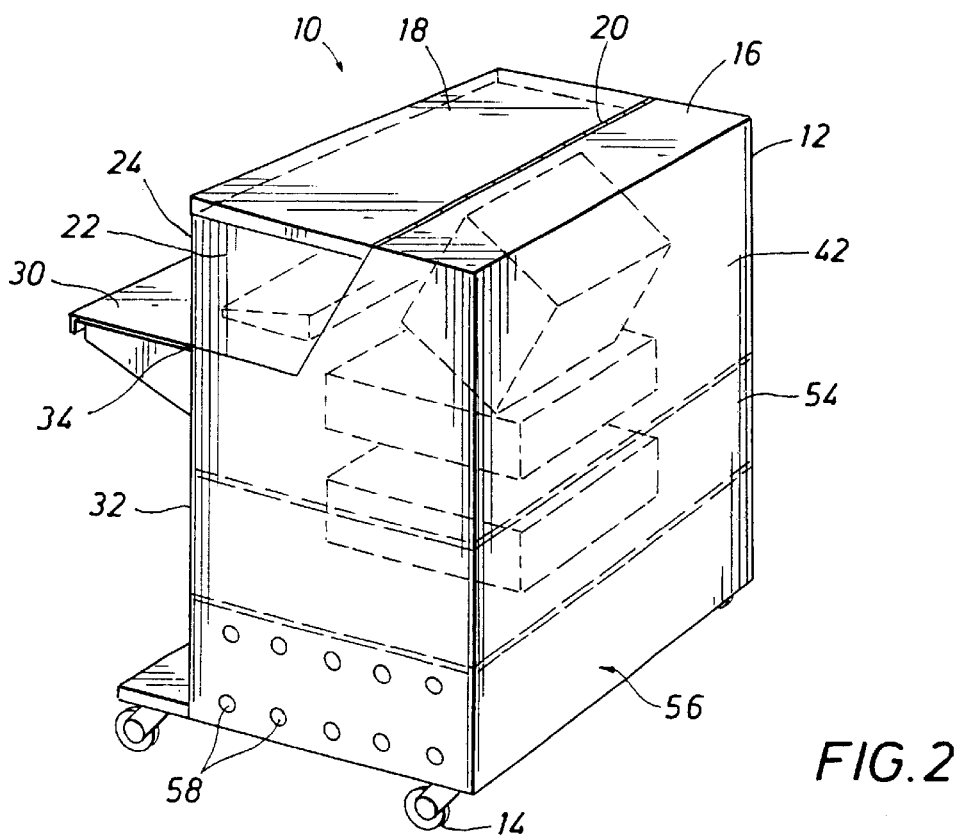

Referring now to the drawings and firs to FIGS. 1 and 2, a control cart constructed according to the teachings of the present invention is shown generally at 10 and includes a cart housing 12 which has mobile support provided by a plurality of wheels 14 which permit the cart to be moved from place to place as needed. Though the control cart 10 may be positioned on the upper tube sheet of a catalytic reactor if desired, typically it will be located to one side of the upper tube sheet where it does not interfere with access to any of the reactor tubes. The upper wall of the cart housing 12 is defined by a fixed wall structure 16 and a pivotally moveable wall section or structure 18 which defines a pivotal closure and is mounted to the fixed wall by a hinge 20, such as a piano hinge. To the pivotal wall section or closure may be mounted side wall sections 22 and a front wall section 24 which, together with the pivotally mounted top wall section 18, define a moveable closure for an internal keyboard shelf 26 which provides support for a computer data entry keyboard 28. A work top 30 is pivotally mounted to the front wall 32 of the housing 12, such as by one or more hinges 34, which permit the work top to be pivoted to an out of the way position when it is not needed, or to permit efficient handling of the control cart during shipment or storage. For stability during use, the work top 30 can be supported by one or more gusset members which may also be pivotally connected to the front wall of the housing and can be pivoted to positions adjacent the front wall to thus permit the work top to be moved to its lowered, out of the way position. If desired, the work top may be a fixed unit, connected to the front wall 32 or it can simply be an extension of the keyboard support shelf 26.

An angulated forwardly facing wall or panel 38 is mounted within the housing 12 and is exposed when the wall 18 is pivoted upwardly about its hinge 20. A monitor 40, which may be in the form of a cathode ray tube or a liquid crystal display or of any other type to permit the display of data, is mounted to or adjacent the panel 38 so as to be visible to personnel using the control cart for controlling certain aspects of one or more testing carts to be discussed below. The monitor 40 is electronically coupled with a computer 42 which is mounted within the control cart or supported within the control cart, such as by a support platform 44 or other support structure. If desired, the computer may be fixed to the support panel or other internal support structure of the control cart, thus preventing the computer from moving about within as the control cart is moved from place to place on the upper reactor floor or tube sheet, or handled for shipment or storage. A printer 46 is likewise supported within the control cart by a support panel or structure 48 and is electronically connected with the computer 42 by an electronic umbilical 50. If desired, a portion 52 of the front wall or a portion of the back wall 54 may be open or may be provided with a moveable closure to permit access to the printer, such as for paper loading, paper removal or other necessary servicing. As desired by the user, the computer driven printer is used to provide a hard copy of data that results from differential pressure testing of the multiplicity of reactor tubes of a catalytic reactor. This feature provides the owner of the reactor, or the reactor servicing contractor or both with a hard copy of the results of differential pressure testing of each of the reactor tubes so that quality catalyst charging can be confirmed and thus provides a benchmark against which future differential pressure testing of the reactor tubes can be compared.

Since differential pressure testing of reactor tubes is accomplished by application of compressed gas, typically air, at controlled pressure and flow rate to the reactor tubes and since compressed gas is utilized for certain operational aspects of the testing carts to be discussed below, the control cart 10 is provided with a compressed gas supply system shown generally at 56. Though the compressed gas being supplied by the control cart may be of any suitable type, typically the compressed gas is air. Thus, where the term "air" is used, it is intended that the compressed gas may be air or any other suitable gaseous medium. The control cart may be provided with an on-board air compressor if desired, or a source of compressed air may be communicated to the control cart via an air supply conduit, such as a flexible air hose that is connected with the gas supply system of the cart by a quick disconnect air fitting or by any other suitable means for connection. The gas supply system 56 includes a manifold conduit receiving compressed air from the air compressor or the flexible air supply hose and with a plurality of test cart air supply outlets 58, one for each of the test carts that can be connected to the control cart system. For example, to provide for optimum reactor tube testing, it is believed that the control cart can be operatively connected with four test carts. However, for very large reactors having 40,000 to 80,000 reactor tubes, it may be desirable to provide the control cart with the capability for operative connection with from six to eight test carts. Thus, the provision of four air supply connectors 58 in the control cart system as shown in FIGS. 1 and 2 is intended as exemplary of one embodiment of the present invention. Each of the air supply connectors will typically take the form of a quick-disconnect air-jack type connector which facilitates simple and efficient connection and disconnection of air supply hoses that extend from the control cart to each of the individual test carts. Each of the conduits in communication with the individual air supply connectors is provided with a shut-off valve so that unused connectors may be closed if the number of test carts being used is less than the number of connectors that are provided in the control cart air supply system.

Figure 3:
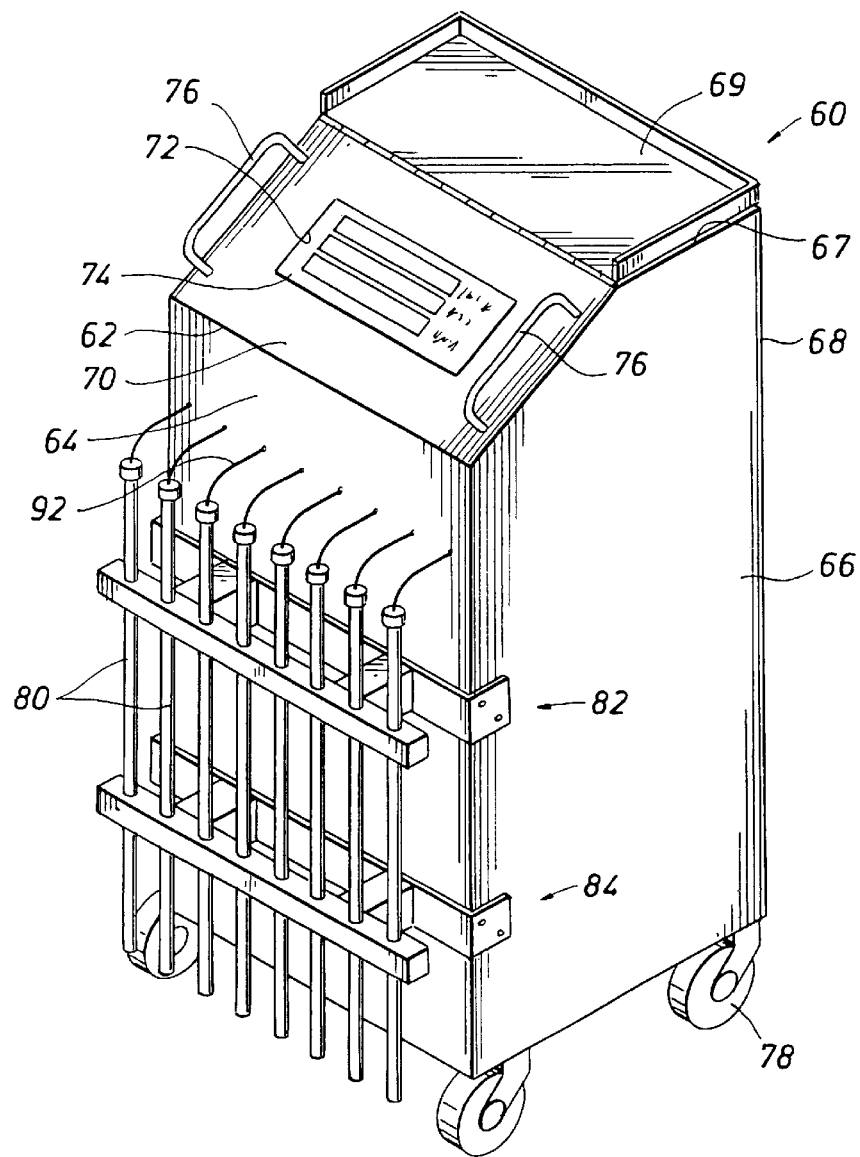
Figure 8:
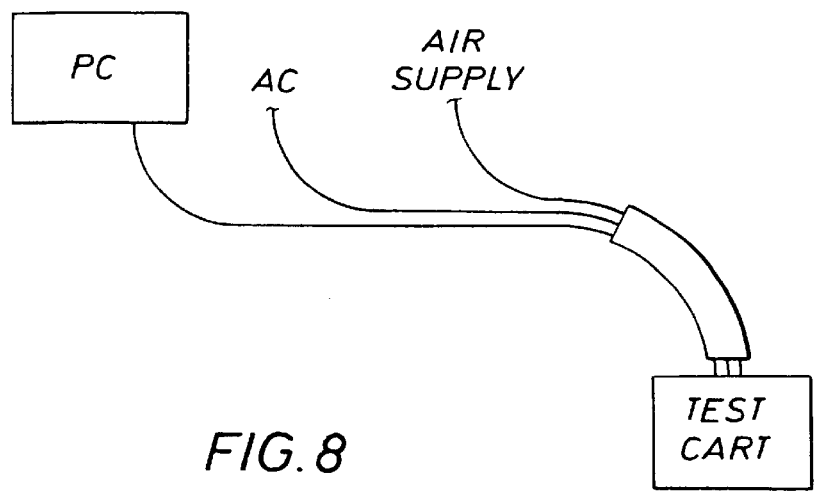

Referring now to FIG. 3, the isometric illustration shows one of a plurality of test carts, shown generally at 60, that are normally utilized for testing reactor tubes for differential pressure. Each test cart 60 has a cart housing 62 having a front wall 64, side walls 66, a top wall 67 and a back wall 68. An angulated wall section 70 extends from the top wall 67 to the front wall 64 and has a rectangular cut-out 72 within which is positioned a data input screen and key pad 74. The data input screen may take the form of a cathode ray tube or liquid crystal display or any other suitable display device permitting visualization of data that is input. Also, instead of a computer keyboard for data entry, any other suitable form of data entry device may be utilized. A cover panel 69 is pivotally mounted at the juncture of the top wall 67 and the angulated wall 70 and is movable to an open position as shown to permit manual access to the data input screen and keypad or to a closed position covering and protecting the data input screen and keypad.

A pair of cart manipulating handles 76 are fixed to the cart structure at the angulated wall 70 or at any other suitable location to permit a worker to move the cart about on the upper tube sheet of a catalytic reactor. Wheels or swivel castors 78 are mounted to the bottom of the cart as shown in FIG. 3, thus enabling the cart to be rolled about on the upper tube sheet and enabling the cart and its testing tubes to be aligned with a selected group of reactor tube openings as desired.

A plurality of testing tubes 80 are mounted to the front wall 64 of the housing 62 by support and positioning assemblies shown generally at 82 and 84 and are moveable to a raised position and lowered to a reactor tube engaging and testing position by a pneumatic actuator system that is manually actuated by the worker that is using the test cart. At the raised position, the lower ends of the testing tubes are clear of the reactor tubes and the upper tube sheet of the reactor, thus permitting the testing cart to be moved for orientation of the testing tubes with another group of reactor tube openings. During each test, a plurality of reactor tubes are simultaneously or selectively tested and the differential pressure test data thereof is transmitted via the control umbilical to the control cart, where the data is processed, handled, stored or otherwise used by the computer and printer system of the control cart.

Figure 5:
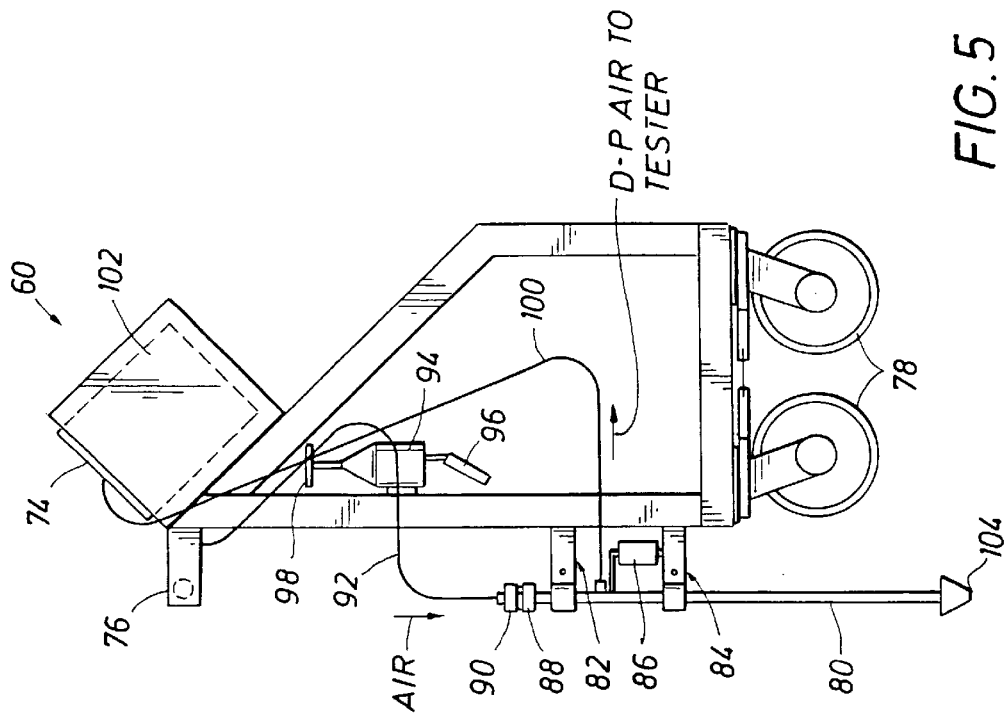
Figure 4:
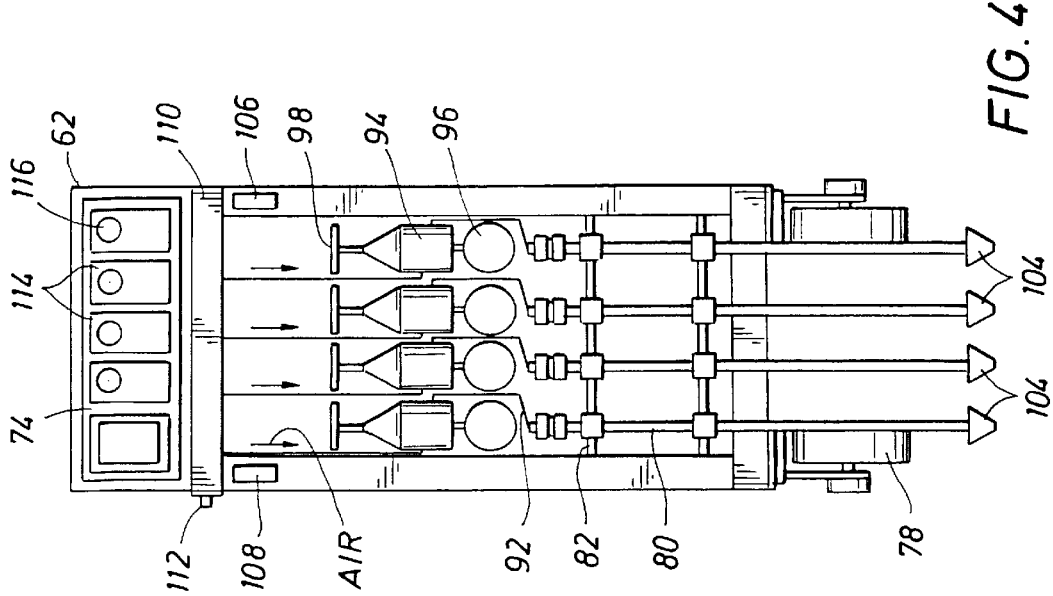

With reference to FIGS. 4 and 5, which illustrate the components of the test carts in greater detail, the moveable testing tubes 80 are shown to be moveable simultaneously by an air cylinder 86. The actuator arrangement to which the testing tubes 80 are mounted may be moveable by the actuator, thus causing all of the testing tubes to be simultaneously raised and lowered. At the upper end of each testing tube is mounted an orifice element 88 which establishes the flow port through which compressed air is communicated to the lower tubular portion of the testing tubes. To the orifice element or to the upper end of each testing tube is provided a connector 90 which connects an air supply conduit 92 to the testing tube. Since the testing tubes are vertically moveable to their raised and lowered positions, the air supply conduit 92 or a portion of it is typically flexible to accommodate such movement. Each air supply line for the individual testing tubes is provided with an air pressure regulator 94 having an air gauge 96 and a regulator adjustment element 98. This feature permits each of the testing tubes to be properly calibrated. Each testing tube is also provided with a differential pressure test or bypass line 100 which communicates with the testing tube below the orifice element 88 and is coupled with a calibration section of the control unit 102 which provides the data input screen and key pad 74. At the lower end of each testing tube 80 is provided a resilient sealing plug element 104 which is in the form of a tapered plug having a lower end that is sufficiently small as to enter the reactor tube being tested. The resilient sealing plug 104 of the testing tube engages within the upper end opening of the reactor tube with sufficient force that the plug is somewhat deformed and sealing engagement thereof with the reactor tube is established.

Figure 6:
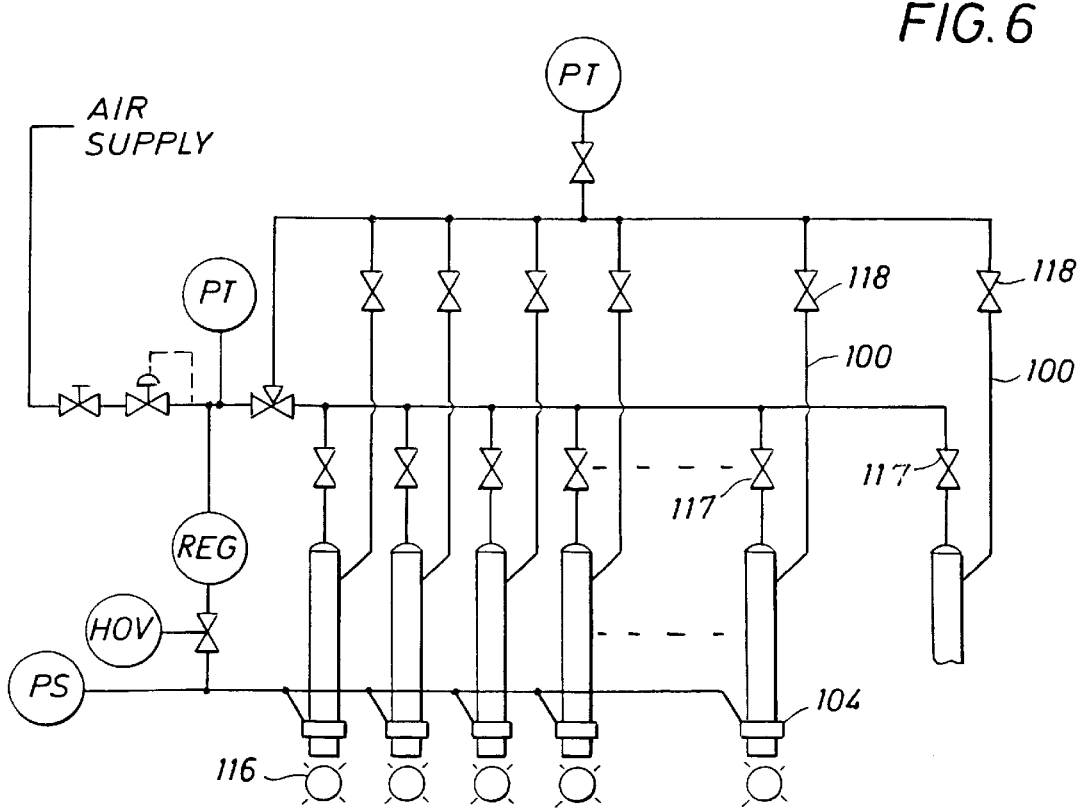

Alternatively, the sealing plug of each reactor tube may be capable of expansion by application of pneumatic or hydraulic pressure as shown in the partially schematic illustration of FIG. 6, so as to expand and seal within the reactor tube opening. As shown at the upper portion of FIG. 4 a hand valve 106 is provided on the test cart housing structure. The valve 106 is a pneumatic valve which is manipulated for application of air pressure to the actuator 86 for raising or lowering the testing tubes. Another hand valve 108 mounted to the test cart housing is also a pneumatic valve which, like valve 106 is in controlling communication with compressed air being supplied by an air supply manifold 110 which receives its air supply via a supply hose through a quick-disconnect air fitting 112. The data display 74 of each test cart includes status indicators 114 having light indicators 116, which are illuminated to show the condition of the testing tubes and thus provide the testing worker with a visual indication that the testing system is in order for conducting a differential pressure test. The status or indicator lights 116 are electrically connected in parallel with the air supply solenoids 117 and are thus illuminated when test pressure is being applied to the testing tubes 80.

As shown by the electrical and pneumatic schematic illustration of FIG. 6, solenoid valves 117 permit communication of compressed air into the testing tubes 80 to enable a differential pressure test to be conducted. Solenoid valves 118 are provided in the differential pressure by-pass lines 100 so that valve actuation occurs electronically as the hand valve actuator 108 is manipulated. For calibration, solenoid valves 118 are provided in the differential pressure by-pass lines so that calibration and differential pressure detection can be accomplished electronically.

Figure 7:
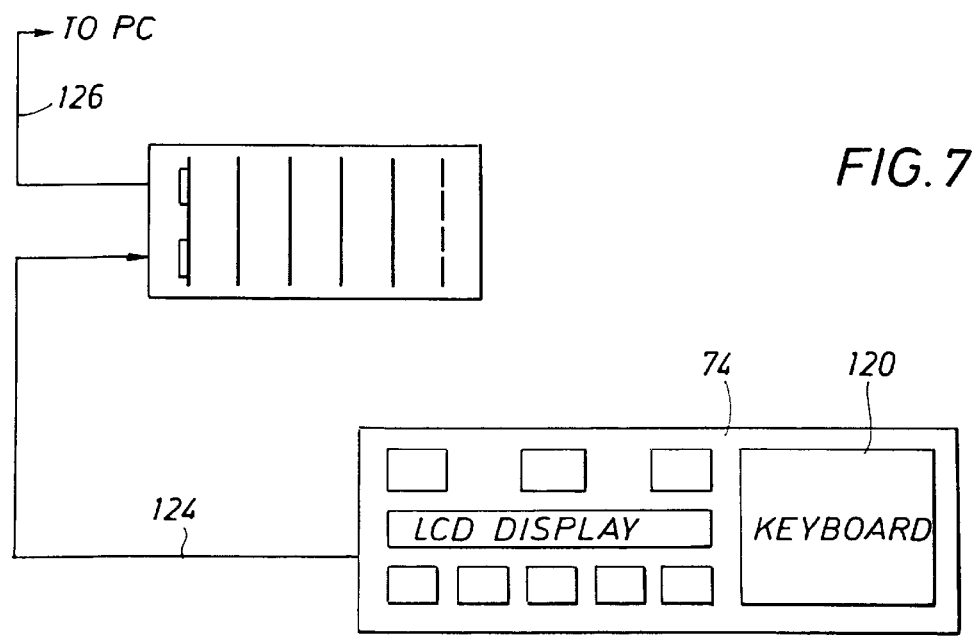

As shown in the electronic schematic illustration of FIG. 7, the data input screen and key pad is shown at 74 and includes a key pad 120 a liquid crystal display 122 and channel pilot lights 116, which are also shown in FIG. 6. The data input screen and key pad, in addition to other electronic features of the data input and display system are connected to circuits of an input/output display rack by a data cable 124. A computer cable 126 is interconnected with the input/output display rack.

Figure 9:
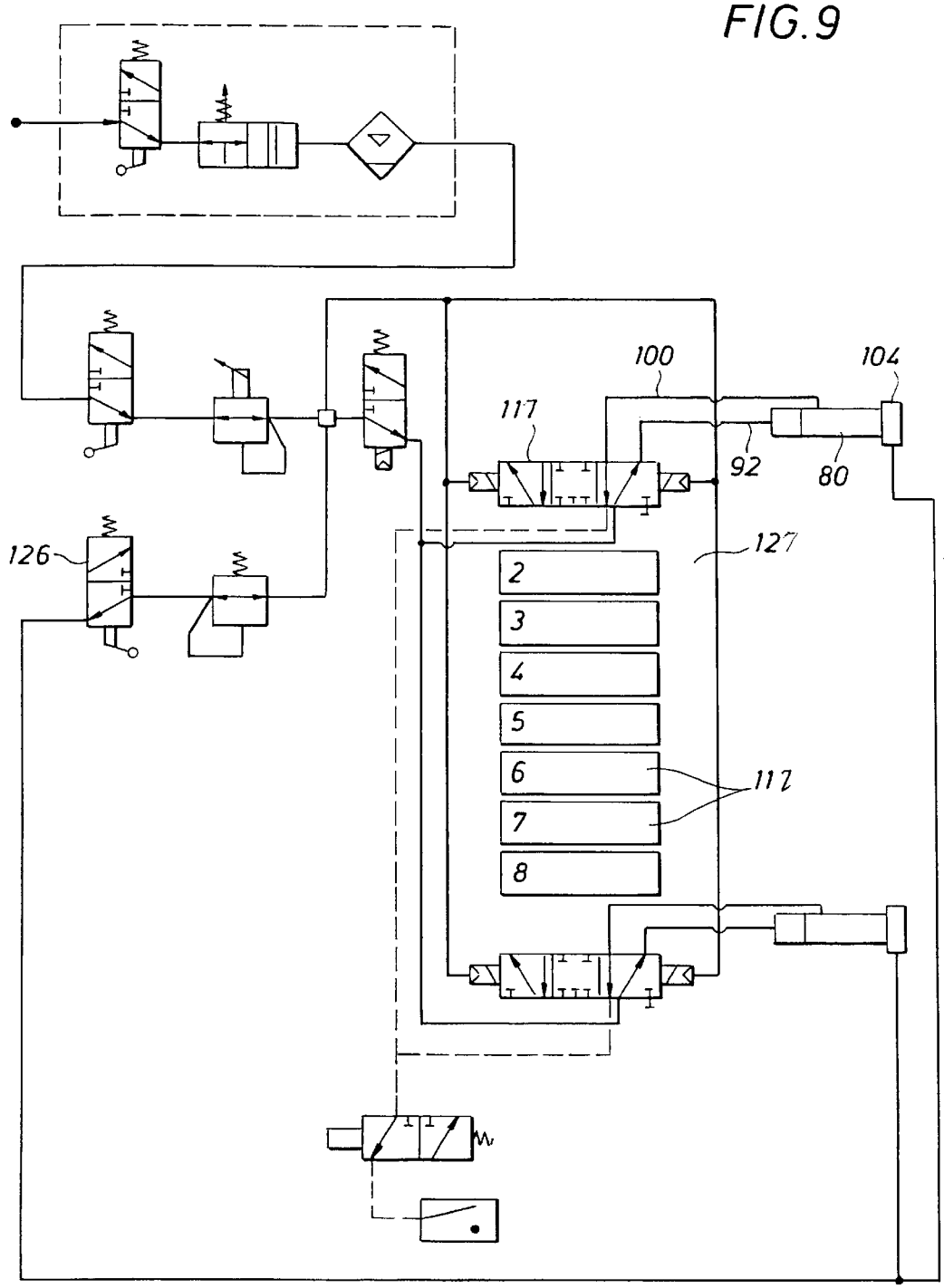

As shown in FIG. 9, the pneumatic schematic indicates that a plurality of 4-way solenoid valves are connected with a common air supply manifold 127. The pneumatic arrangement is such that compressed air is delivered to the testing tubes 80 by the 4-way solenoid valves and a solenoid valve is used to communicate compressed air to the inflatable sealing stoppers 104 for sealing with a plurality of reactor tubes to be tested.

System Overview

The Delta P Testing System consists of (1) Control Cart and (4) 8 Channel Test Carts. The Control Cart can be positioned in a clean environment, remote to the actual testing area. All utility supply connections are made at the Control Cart, and the Test Carts are connected to the Control Cart with umbilical cord assemblies, which provide the utility requirements for each cart.

The Control Cart contains a master air pressure regulator, a power conditioner, a network hub, a computer which runs the actual control and data acquisition software programs, and a printer for printing test result reports. The computer monitor, keyboard and mouse provide the operator the ability to input test configuration parameters and to monitor the progress of all 4 Test Cart activities.

Each Test Cart contains a Pressure Controller, PLC I/O Rack, Operator Interface Panel, Pressure Transmitter, Delta P Transmitter, 24 VDC Power Supply, and the field devices (solenoid valves limit switches, etc,) required to sequentially test and collect the Delta P data from the 8 individual test channels. All field devices (switches, solenoids, etc.) are individually fused to quickly isolate device failures, and to provide protection for the sensitive electronic equipment. The Operator Interface Panel has (5) Pushbuttons, (3) Status Lights, a (2) Line by (20) character Message Display, and a Numeric Keypad. It provides the technician with the means to enter the required data and to monitor and control the actual test activities. Each channel is also equipped with (3) Pilot Lights which summarize that channel's testing mode and result. In addition to the eight test channels, each Test Cart is equipped with a separate Calibration Channel, which is used to check and confirm the actual Delta P calibration. Calibration can be manually initiated at the beginning of each test cycle, or will be automatically initiated following the logging of 96 data points.

Data Collection Configuration

The reactor tube sheet is divided into pie shapes (4, 8, or 16 depending on the size of the reactor), and each reactor tube is assigned a 4-digit location number within that section. This gives every reactor tube a unique tag number which is displayed and reported as "Section #. Location #" (e.g. 2.0010=Section #2, Location #0010).

As each reactor tube is tested, all associated test data, along with all test setpoints, are logged to a record in a Microsoft Access Database. Each record contains the following information: Tag Number, Test Number, Blowdown Pressure Setpoint, Blowdown Pressure Reading, Blowdown Duration Setpoint, Blowdown Duration Actual, Test Pressure Setpoint, Test Pressure Reading, Test Delta P Target, Test Delta P Reading, Test Delta P Tolerance, Test Delta P High Limit, Test Delta P Low Limit, Calibration Delta P Target, Calibration Delta P Reading, Channel Disabled Reason, Date/Time, Cart Number, Channel Number, Calibration Count, Cumulative Count, Project Number, Customer Name, Customer Location, and Reactor Number. Once logged to the MS Access database, the data can be sorted and/or filtered to provide the information required for efficient reporting of the test results. This eliminates the manually logging of enormous amounts of data, and streamlines the analysis of the results.

SEQUENCE OF OPERATION

System Setup

Position the Control Cart in a clean environment adjacent to the reactor to be tested, and connect the required utilities (Compressed Air and 120 VAC Power).

Position the 4 Test Carts on the reactor tube sheet and connect the umbilical cords to the Control Cart. The umbilical provides the utilities required by the Test Cart. (Compressed Air, 120 VAC Power, and the Network Connection to the PC).

Turn on the utilities to the Control Cart.

At the PC Monitor (on the Control Cart), enter the Project Specific Parameters. These parameters are common to all 4 Test Carts, and can only be changed when all 4 Test Carts are in the "OK to Move" status. These parameters include:

Project Number

Customer Name

Customer Location

Reactor Number

At the PC Monitor (on the Control Cart), enter the Test Setup Parameters for each of the 4 Test Carts. These parameters configure the actual test, and are unique to each Test Cart, thereby providing the flexibility to have the various carts at different stages of the Reactor Test Plan. The actual Delta P Test can be preceded by an optional Blowdown operation, at a selectable pressure and duration. These parameters can only be changed when the respective cart is in the "OK to MOVE" status. These parameters include:

Test No.

Blowdown Enable/Disable Selection

Blowdown Pressure Setpoint

Blowdown Duration Setpoint

Test Pressure Setpoint

Test Delta P Target

Test Delta P Tolerance (used to calculate the High and Low Limits)

The Delta P Testing System is now configured and ready for testing.

Additionally, through the use of comprehensive. Operator Screens, the progress of the actual test activities for all 4 Test Carts can be monitored at the Control Cart PC Monitor.

Delta P Testing

"OK to MOVE"—Status light is illuminated.

Position the 8 Channel Test Cart over the reactor tubes to be tested.

Manually lower the 8 Channel Manifold so the testing tubes fit inside of the reactor tubes. A limit switch confirms the correct extension of the manifold. Each channel is provided with the capability to be raised, and thereby disabled, to allow for cases such as thermocouples, plugs, etc. When disabled, the channel is not pressure tested, however the technician is prompted for the reason the channel is disabled. This reason, along with all of the other test parameters is logged to the database.

Manually inflate the bladders, thereby sealing the individual test tubes inside the reactor tubes. A pressure switch confirms proper bladder inflation.

The following test sequence takes place through the Test Cart Operator Interface Panel, which prompts the technician through the data entry and data logging functions. Specific function pushbuttons (START, LOG POINT, YES, NO) and the numeric keypad facilitate the data entry and control functions, while Status Lights (OK to MOVE, CAL in Progress, TEST in Progress) and a two line message display summarize the sequence of operation. Every operator entry is echoed back to the technician, thereby giving the opportunity to correct data entry errors. Upon initiating the Test Cycle, the Test Cart sequences through each of the eight channels, testing and logging the data to the database.

Press "START"

"OK to MOVE" Status Light goes out, and the Test Cycle begins.

Enter "Section Number" (reference the Data Collection Configuration section).

Calibrate? YES/NO (Calibration can be manually selected, or will automatically initiate following 96 data points)

If Calibration is selected, the "CAL in Progress" Status Light illuminates.

The Test Pressure Setpoint is automatically sent to the Pressure Controller, the appropriate solenoid valves are actuated, and the Calibration Channel is subjected to the Test Pressure.

The corresponding Calibration Delta P Reading is calculated and displayed to the technician.

The technician is prompted to "LOG POINT". Time should be allowed for the stabilization of the Calibration Delta P Reading before pressing the "LOG POINT" pushbutton. Pressing "LOG POINT" logs the data record for this Calibration channel to the database for later analysis and reporting.

Following the logging of the Calibration data point, the respective solenoid valves close, the "CAL in Progress" Status light goes out, and the Blowdown/Delta P Testing proceeds.

If Calibration is not selected, testing proceeds directly to Blowdown/Delta P Testing.

"TEST in Progress" Status light illuminates.

Enter "Location Number", for the reactor tube being tested by the current test channel. (reference the Data Collection Configuration section.)

If Blowdown is enabled, the Blowdown Pressure Setpoint is automatically sent to the Pressure Controller, the appropriate solenoid valves are actuated, and the reactor tube is subjected to the Blowdown Pressure for the amount of time set by the Blowdown Duration Setpoint. A pilot light, located above the respective channel, illuminates for the duration of the Blowdown Cycle. Following timeout of the duration timer, the solenoid valves close, the "Blowdown in Progress" pilot light goes out, and the channel proceeds to Delta P testing.

If Blowdown is disabled, the channel will proceed directly to Delta P testing.

For Delta P Testing, the Test Pressure Setpoint is automatically sent to the Pressure Controller, the appropriate solenoid valves are actuated, and the reactor tube is subjected to the Test Pressure. A pilot light, located above the respective channel, illuminates for the duration of the Delta P Test Cycle.

The corresponding Test Delta P Reading is calculated and displayed to the technician.

If the Test Delta P Reading is greater than the High Limit, or less than the Low Limit, a pilot light, located above the respective channel, illuminates thereby indicating a "DP Out of Spec" condition. This pilot light remains illuminated until the next Test Cycle is initiated, by pressing the "START" pushbutton. This permits the technician the opportunity to raise the manifold, following the completion of the current Test Cycle, and tag the defective reactor tube with a colored plug, or equal.

The technician is prompted to "LOG POINT". Time should be allowed for the stabilization of the Test Delta P Reading before pressing the "LOG POINT" pushbutton. Pressing "LOG POINT" logs the data record for this test channel to the database for later analysis and reporting.

Following the logging of the data point, the respective solenoid valves close, and the test sequence proceeds to the next channel.

Once all eight channels have been sequentially tested, the "TEST in Progress" Status light goes out, and the "OK to MOVE" Status light is illuminated.

Move the Test Cart to the next test location and repeat the test sequence for the next eight reactor tubes.

Note: A failure of either of the two pressure transmitters is displayed on both the Test Cart Operator Interface Panel and the Control Cart PC Monitor. This quickly identifies an instrument failure and prevents the logging of erroneous data.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

What is claimed is:

1. A multi-tube differential pressure testing system for testing the differential pressure of catalyst filled tubes of tube and shell type catalytic reactors having an upper tube sheet and multiple catalyst tubes having upper ends thereof fixed to the upper tube sheet, comprising:

at least one mobile support device being selectively positioned on the upper tube sheet of a catalytic reactor in pressure testing relation with a plurality of catalyst filled reactor tubes;

a plurality of testing tubes being mounted to said mobile support device and being simultaneously positioned in sealed gas pressure communicating engagement with the upper ends of a plurality of reactor tubes;

a pressure testing gas delivery system being interconnected with said plurality of testing tubes and communicating pressurized gas at a selected test pressure to said plurality of testing tubes and into the reactor tubes being engaged by said plurality of testing tubes; and a differential pressure monitoring system measuring the back pressure resulting from application of gas pressure at the selected test pressure to the plurality of reactor tubes being tested and having a differential pressure indicator system providing indication of the resulting back pressure of each reactor tube being tested.

2. The multi-tube differential pressure testing system of claim 1, said at least one mobile support device comprising:

at least one pressure testing cart structure having a housing and a plurality of wheels permitting said pressure testing cart structure to be moved on the upper tube sheet of the reactor;

said plurality of pressure testing tubes each having upper and lower ends and being mounted to said cart for simultaneous reciprocation from a raised position out of contact with the reactor tubes of the catalytic reactor to a testing position where said lower ends of said plurality of testing tubes establish simultaneous sealing engagement with the upper ends of a plurality of the reactor tubes; and a testing tube actuator being mounted to said at least one pressure testing cart structure and selectively and simultaneously moving said plurality of testing tubes between said raised positions and said testing positions.

3. The multi-tube differential pressure testing system of claim 2, said testing tube actuator comprising:

an actuator support being movably supported by said testing cart structure, said plurality of testing tubes being mounted to said actuator support;

a gas pressure operated actuator being actuatable and moving said actuator support to said raised position and to said testing position; and an actuator gas supply being in controlling communication with said gas pressure operated actuator and having an actuator control valve being selectively actuatable and moving said actuator support to said raised position and said testing position.

4. A multi-tube differential pressure testing system for differential pressure testing catalyst filled tubes of tube and shell type catalytic reactors having an upper tube sheet and multiple catalyst tubes having upper ends thereof fixed to the upper tube sheet, comprising:

at least one mobile support device being selectively positioned on the upper tube sheet of a catalytic reactor in pressure testing relation with a plurality of catalyst filled reactor tubes;

a plurality of testing tubes being mounted to said mobile support device and being simultaneously positioned in sealed gas pressure communicating engagement with the upper ends of a plurality of reactor tubes;

a pressure testing gas delivery system being interconnected with said plurality of testing tubes and commu-nicating pressurized gas at a selected test pressure to said plurality of testing tubes and into the reactor tubes being engaged by said plurality of testing tubes; and a differential pressure monitoring system measuring the back pressure resulting from application of gas pressure at the selected test pressure to the plurality of reactor tubes being tested and having a differential pressure indicator system providing indication of the resulting differential pressure of each reactor tube being tested;

said a differential pressure monitoring system detecting the back pressure of each reactor tube being tested and providing an electronic signal representative of the detected back pressure of each reactor tube; and a computer system receiving the electronic signal representing the measured differential pressure of each of said plurality of reactor tubes and providing a computer generated record thereof.

5. The multi-tube differential pressure testing system of claim 4, comprising:

a system specifically identifying each of the multiplicity of reactor tubes of the catalytic reactor tubes and enabling manual or automated location thereof; and said computer system assigning an identity to each of said multiplicity of reactor tubes being tested and providing said identity in said record, and enabling workers to identify and service specific reactor tubes of the catalytic reactor via utilization of said record.

6. The multi-tube differential pressure testing system of claim 4, comprising:

a control cart being selectively positioned relative to the upper tube sheet of the catalytic reactor;

said at least one testing cart being a plurality of pressure testing carts; and umbilical elements, including electrical and pneumatic conductors interconnecting said control cart with said plurality of pressure testing carts.

7. The multi-tube differential pressure testing system of claim 4, comprising:

said computer system being located on said control cart and being connected by said umbilical elements for electronic communication with electronic signal systems of each of said testing carts; and said computer system having a computer processor, keyboard data signal device, data printer and data memory system for processing differential pressure signals resulting from testing each of said multiplicity of reactor tubes, printing a record identifying the testing results of each reactor tube and for acquiring the differential pressure signals resulting from testing each of said multiplicity of reactor tubes in said data memory system of said computer.

8. A method for conducting simultaneous back pressure tests on a plurality of reactor tubes of a tube and shell type catalytic reactor having an upper tube sheet and a multiplicity of reactor tubes having upper ends thereof fixed to the upper tube sheet, said method comprising:

selectively positioning on the upper tube sheet a mobile support device having a plurality of pressure testing tubes and having a pressure testing gas delivery system selectively communicating test pressure simultaneously to said plurality of pressure testing tubes and having a differential pressure monitoring system providing back pressure measurement data of each of said plurality of pressure testing tubes;

selectively positioning said plurality of pressure testing tubes in sealed engagement with the plurality of reactor tubes being tested;

selectively communicating test pressure from said pressure testing gas delivery system to each of said plurality of pressure testing tubes and the plurality of reactor tubes being tested; and with a pressure detector, detecting the measured back pressure of each of said plurality of pressure testing tubes and the plurality of reactor tubes being tested.

9. The method of claim 8, comprising:

recording the measured back pressure of each of said plurality of pressure testing tubes and the plurality of reactor tubes being tested.

10. The method of claim 8, comprising:

with a computer connected with said pressure detector, electronically recording the measured back pressure of each of said plurality of pressure testing tubes and the plurality of reactor tubes being tested.

11. The method of claim 8, comprising:

providing a source of pressurized gas and a source of electrical energy;

communicating said source of pressurized gas and said source of electrical energy with said mobile support device via at least one umbilical; and energizing and controlling said pressure testing gas delivery system and said pressure detector via said at least one umbilical.

12. The method of claim 8, wherein said pressure detector comprises at least one back pressure sensor and a computer connected with said at least one back pressure sensor and recording sensed back pressure, said method comprising:

with said at least one back pressure sensor, sensing the back pressure of each reactor tube being tested; and with said computer, processing back pressure signals of said at least one back pressure sensor and recording said back pressure signals.

13. The method of claim 12, comprising:

providing a computer printout representative of the sensed back pressure of each of the reactor tubes tested.

14. A multi-tube differential pressure testing system for testing a plurality of catalyst filled tubes of tube and shell type catalytic reactors having an upper tube sheet and multiple catalyst tubes having upper ends thereof fixed to the upper tube sheet, comprising:

at least one mobile support device being selectively positioned on the upper tube sheet of a catalytic reactor in pressure testing relation with a plurality of catalyst filled reactor tubes;

a plurality of testing tubes being mounted to said mobile support device and being simultaneously positioned in sealed gas pressure communicating engagement with the upper ends of a plurality of reactor tubes;

a pressurized testing gas delivery system being interconnected with each of said plurality of testing tubes and communicating pressurized gas at a selected test pressure to said plurality of testing tubes and into the reactor tubes being simultaneously engaged by said plurality of testing tubes;

a differential pressure monitoring system measuring the back pressure resulting from application of gas pressure at the selected test pressure to each of the plurality of reactor tubes being tested and having a differential pressure indicator system providing an electronic signal representative of the detected back pressure of each reactor tube; and a computer system receiving and processing the electronic signal of each of said plurality of reactor tubes and providing a computer generated record thereof.

15. The multi-tube differential pressure testing system of claim 14, comprising:

at least one pressure testing cart structure having a housing and a plurality of wheels permitting said pressure testing cart to be moved on the upper tube sheet of a catalytic reactor;

an actuator support being movably supported by said testing cart structure, said plurality of testing tubes being mounted to said actuator support and being simultaneously moved by said actuator support;

a pressurized gas operated actuator being actuatable and moving said actuator support and said plurality of testing tubes to said raised position and to said testing position; and an actuator gas supply being in controlling communication with said gas operated actuator and having an actuator control valve being selectively actuatable and simultaneously moving said actuator support and said plurality of testing tubes to said raised position and said testing position.

16. The multi-tube differential pressure testing system of claim 14, comprising:

a system specifically identifying each of the multiplicity of reactor tubes of the catalytic reactor tubes and enabling manual or automated location thereof; and said computer system assigning an identity to each of said multiplicity of reactor tubes being tested and providing said identity in said record and enabling workers to identify and service specific reactor tubes of the catalytic reactor via utilization of said record.

17. The multi-tube differential pressure testing system of claim 16, comprising:

a control cart being selectively positioned relative to the upper tube sheet of the catalytic reactor;

said at least one testing cart being a plurality of pressure testing carts; and umbilical elements, including electrical and pneumatic conductors interconnecting said control cart with said plurality of pressure testing carts.

18. The multi-tube differential pressure testing system of claim 16, comprising:

said computer system being located on said control cart and being connected by said umbilical elements for electronic communication with electronic signal systems of each of said testing carts; and said computer system having a computer processor, keyboard data signal device, data printer and data memory system for processing differential pressure signals resulting from testing each of said multiplicity of reactor tubes, printing a record identifying the testing results of each reactor tube and for acquiring the differential pressure signals resulting from testing each of said multiplicity of reactor tubes in said data memory system of said computer.

* * * * *